US006389675B1

(12) United States Patent
Tykoski et al.

(10) Patent No.: US 6,389,675 B1
(45) Date of Patent: May 21, 2002

(54) METHOD FOR ATTACHING A CONNECTOR TO A HOSE

(75) Inventors: Leo Anthony Tykoski, Canton; Robert Harold Wilson, Columbiaville, both of MI (US)

(73) Assignee: Ford Global Tech., Inc., Dearborn, MI (US)

( * ) Notice: Subject to any disclaimer, the term of this patent is extended or adjusted under 35 U.S.C. 154(b) by 0 days.

(21) Appl. No.: 09/496,633

(22) Filed: Feb. 2, 2000

(51) Int. Cl.[7] .......................... B23Q 3/00; B23P 19/00; B25B 7/02

(52) U.S. Cl. ............................ 29/468; 29/464; 29/750; 81/426.5

(58) Field of Search .......................... 29/468, 750, 751, 29/857, 402.09, 283, 281, 278, 464; 81/424.5, 426.5; 901/31

(56) References Cited

U.S. PATENT DOCUMENTS 1,910,750 A * 5/1933 Clark
2,714,321 A * 8/1955 Tamplin
2,986,192 A * 5/1961 Macleod
4,626,013 A * 12/1986 Barrows ...................... 294/88
5,305,669 A * 4/1994 Kimbo et al. ................. 81/423

* cited by examiner

*Primary Examiner*—S. Thomas Hughes
*Assistant Examiner*—John C. Hong
(74) *Attorney, Agent, or Firm*—Ford Global Tech. Inc.

(57) ABSTRACT

A tool 10 having a pair of movably connected handles 12,14, each of which respectively include a substantially identical and generally semi-cylindrical retention member 20,22, The tool 10 may be used to secure a connector 36 upon end 34 of hose 28 while protecting a user of the tool 10 from contact with the frayed sheathing portions 32 proximate to end 34. In operation, end 34 is secured between members 20 and 22 and the connector 36 is forced onto end 34, thereby attaching the connector 36 to the hose 28. In alternate embodiments, members 20,22 may be removably connected to handles 12,14 or may be integrally formed with a robotic arm 52.

11 Claims, 3 Drawing Sheets

METHOD FOR ATTACHING A CONNECTOR TO A HOSE

FIELD OF THE INVENTION

This invention relates to a connector attachment tool and more particularly, to a tool which selectively attaches a connector to a hose and to a method for attaching such a connector to a hose.

BACKGROUND OF THE INVENTION

Hoses are used in a wide variety of apparatuses, such as and without limitation within automobiles, to receive and convey or transport fluid to a device, such as a hydraulic type brake, in order to cause the device to perform some desired function (e.g. braking of the vehicle). Accordingly, many of these hoses are typically and physically connected to a device or assembly which is to selectively receive the transported fluid and/or to a source of the fluid. Some of these hoses are also connected to other hoses and cooperate with these other hoses to transport the fluid in a desired manner. Accordingly, a connector must typically be attached to each end of each of the hoses in order to allow these hoses to be easily and efficiently connected to a source of fluid, to a device which is to receive the fluid, and/or to other hoses in the previously delineated manner.

Since a relatively diverse number of hose lengths are required within an apparatus and since these numbers and lengths may change as the apparatus is modified, it is typically efficient to obtain one or more relatively large rolls of hose and to selectively cut these rolls in order to provide for a desired number of hoses having a respective and desired length. Moreover, to increase the resistance of these provided or created hoses to structural damage or deformation, each rolled hose is typically contained within a sheath or outer cover which is typically formed from braided or intermeshing wire or some other relatively hard but flexible material.

While these sheathed rolls of hose allow various numbers and lengths of hoses to be efficiently created, they do not allow the required connectors to be easily and efficiently placed upon the created hoses. That is, the sheath at each end of each formed hose is typically dislodged from the hose or is frayed due to the cutting or removal of each respective hose from the roll. A dislodged sheath may contact an individual (e.g. the hand of an individual) placing connectors upon each end of a hose and cause pain, discomfort, or annoyance to that individual, thereby reducing connector placement efficiency and undesirably increasing the overall cost of assembling these hoses.

There is therefore a need for a tool which allows connectors to be placed upon a hose in a manner which reduces the potential or liklihood of contact between an individual and a dislodged sheath as the individual places the connectors upon the hose. There is also a need for a method for placing connectors upon a hose which overcomes some or all of the previously delineated drawbacks of prior connector placement methods.

SUMMARY OF THE INVENTION

It is a first object of the present invention to provide a tool which allows for the selective placement of a connector upon a hose in a manner which overcomes the previously delineated drawbacks of prior connector placement methodologies.

It is a second object of the invention to provide a method for placing a connector onto a hose which overcomes the previously delineated drawbacks of prior connector placement methodologies.

According to a first aspect of the present invention an apparatus is provided for use with a hose of the type having a frayed end portion upon which a connector is to be attached. The apparatus includes a hose retention cavity which selectively receives the frayed end portion and the connector, thereby allowing the connector to be selectively attached to the frayed end portion.

According to a second aspect of the present invention an apparatus is provided comprising a first handle having a first retention portion; and a second handle which is pivotally coupled to the first handle and which has a second retention portion which is substantially identical to the first retention portion and which cooperates with the first retention portion to selectively form a hose retention cavity.

According to a third aspect of the present invention a method for placing a connector upon a braided hose is provided. The method comprises the steps of providing a first member; providing a second member; providing first and second retention members; placing the first retention member upon the first member; placing the second retention member upon the second member; placing a portion of the braided hose upon the second retention member; causing the second retention member to contact the first retention member, effective to form a hose reception cavity which contains the portion of the braided hose; and placing the connector upon the portion of said hose residing within the hose reception cavity.

These and other features, aspects, and advantages of the present invention will become apparent from a reading of the following detailed description of the preferred embodiment of the invention and by reference to the following drawings.

DETAILED DESCRIPTION OF THE PREFERRED EMBODIMENT OF THE INVENTION

Figure 1:
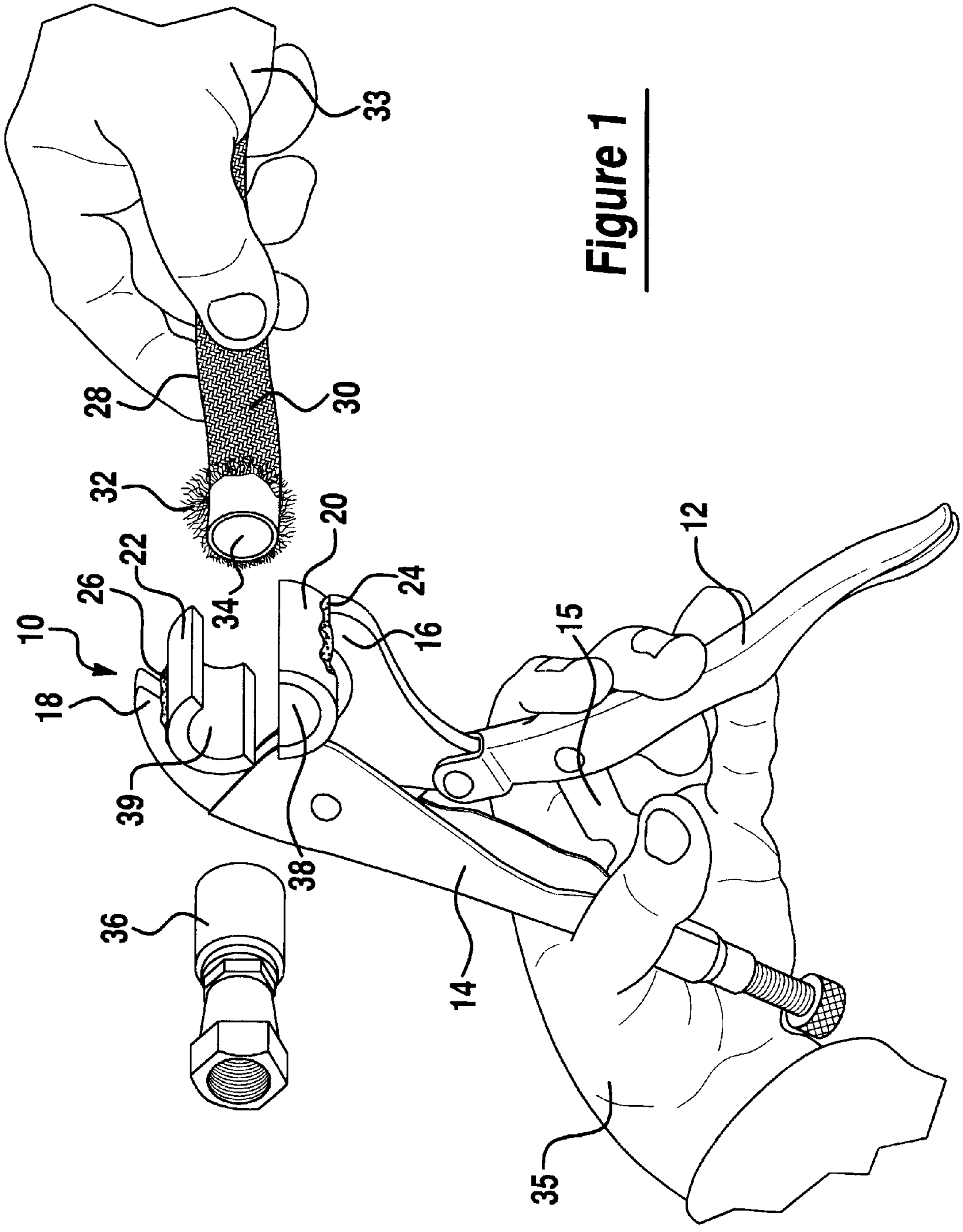
FIG. 1 is a perspective view of a tool which is made in accordance with the teachings of the preferred embodiment of the invention in combination with a hose and a connector.
Figure 2:
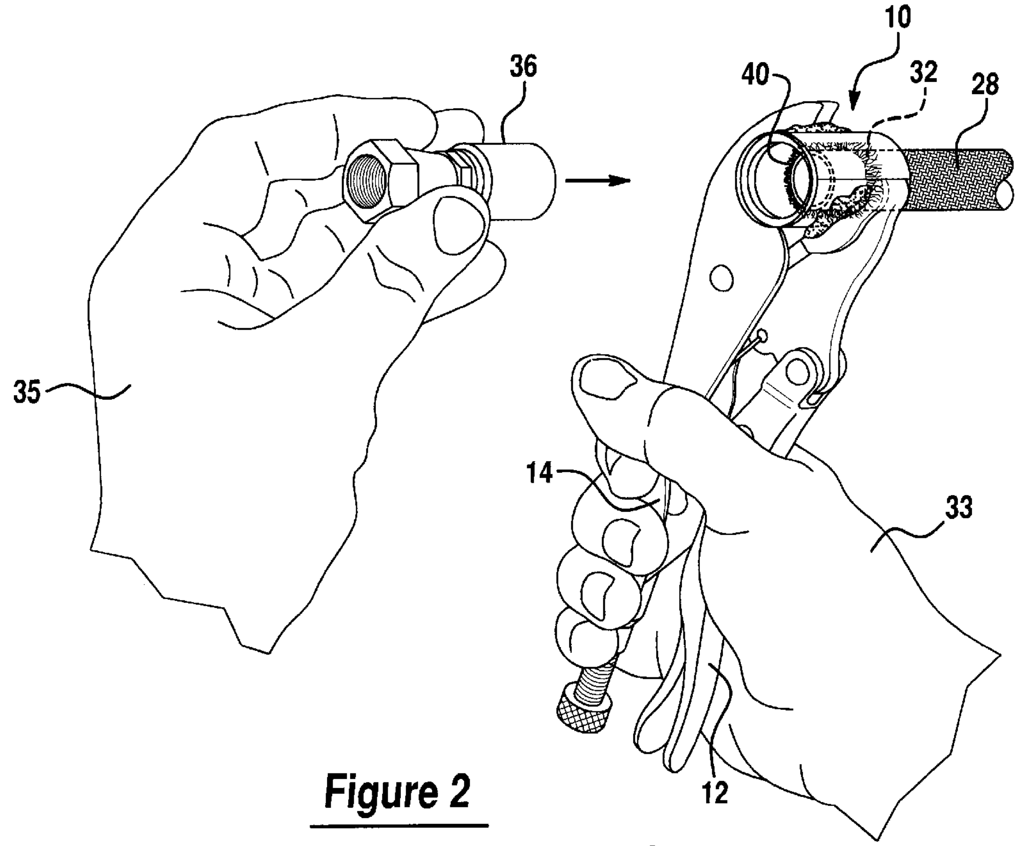
FIG. 2 is a perspective view of the tool, the hose, and the connector which are shown in FIG. 1 and which further illustrates the selective retention of the hose by the tool.
Figure 3:
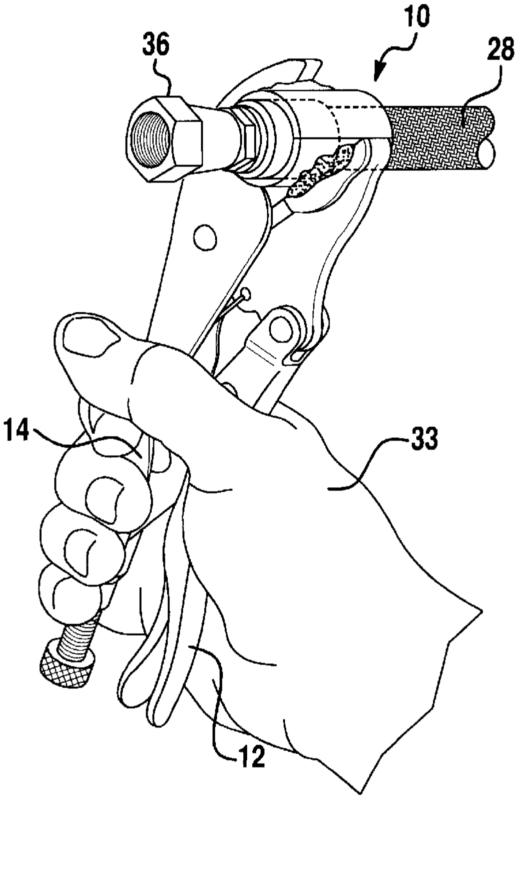
FIG. 3 is a view similar to that shown in FIG. 2 but further illustrating the placement of the connector upon the selectively retained hose.

Referring now to FIGS. 1–3, there is shown a connector attachment tool 10 which is made in accordance with the preferred embodiment of the invention. As shown, tool 10 includes a first handle 12 which is pivotally connected to a second handle 14 by a selectively collapsible member 15. Each handle 12, 14 includes a respective and generally arcuate or generally "C"-shaped end portion 16, 18, each of which respectively receives a substantially identical and generally semi-cylindrical hose retention or engagement member 20, 22. Particularly, each member 20,22 may be selectively welded to the respective end portions 16, 18, thereby forming respective welded connection joints 24, 26. It should be appreciated that, in one non-limiting embodiment of the invention, tool 10 may comprise a conventional and commercially available vise-grip type tool to which members 20, 22 are attached in the manner shown in the FIGS. 1–3.

In operation, hose 28 having an outer sheath 30 which may comprise, by way of example and without limitation, braided or intermeshing wire is provided. As shown, dislodged or frayed portions 32 of sheath 30 are typically formed proximite to end 34 by cutting the hose 28 from a roll (not shown). Moreover, a connector 36 is further provided and is to be selectively attached to end 34 and over the frayed sheathing portions 32 in order to allow the hose 30 to be connected to other hoses, devices, or sources of fluid.

As shown best in FIG. 1, end 34 of the hose 28 may be grasped by one hand 33 of a user while the second hand 35 of the user grasps handles 12, 14. In this manner, the end 34 of the hose 28 is placed upon the relatively smooth interior or hose contacting surface 38 of member 20. It should be appreciated that interior surface 38 and the corresponding interior surface 39 of member 22 are smooth in order to protect and substantially reduce the likelihood of damage to the hose 28. The user, by use of hand 35, then moves handle 12 toward handle 14, effective to cause member 15 to selectively collapse and cause member 20 to engage member 22, thereby forming a hose retention portion or cavity 40 which shields the frayed or dislodged sheathing 32 from the hands 33,35 of the user.

As shown best in FIGS. 2 and 3, hand 33 is removed from the hose 28 and grasps handles 12 and 14 while hand 35 grasps the connector 36 and causes the grasped connector 36 to be selectively moved into the cavity 40 while forcibly causing the connector 36 to receive and cover end portion 34. In this manner, the connector 36 is attached to the hose 28 while covering the frayed sheathing portions 32 in a manner which substantially prevents contact between the frayed end portion 32 and the hands 33, 35.

After the connector 36 is applied to the hose 28, hand 33 allows or causes the handle 12 to be moved away from handle 14 (i.e. member 15 is selectively allowed to expand), effective to cause members 20 and 22 to become disengaged and to allow the hose 28 and the attached connector 36 to be removed from the tool 10. After the hose 28 is removed from the tool 10, the attached connector 36 may be crimped or further secured to the hose 28 in a known and conventional manner. It should be appreciated that members 20,22 may be provided in a relatively wide variety of sizes and shapes which correspond to the various sizes of hose to which connectors 36 are to be applied and that a connector 36 may be similarly attached to the opposite frayed end of hose 28 (not shown).

Figure 4:
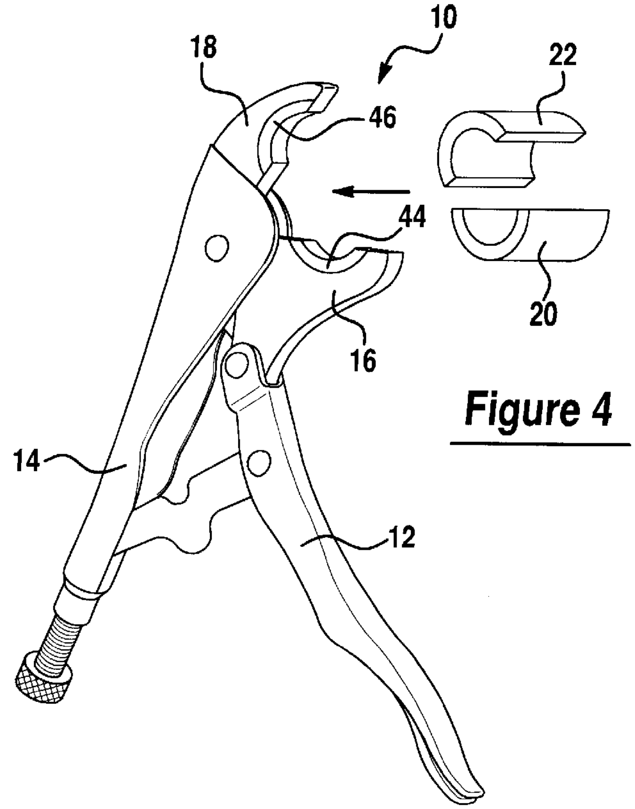
FIG. 4 is a perspective view of a tool which is made in accordance with the teachings of a second embodiment of the invention.

In an alternate embodiment of the invention, as shown best in FIG. 4, end portions 16 and 18 respectively include substantially identical grooves 44, 46 which respectively receive members 20, 22, thereby frictionally, respectively, and removably attaching or securing the members 20,22 onto portions 16,18 for use in the foregoing connector attachment process. After completion of the connector attachment process, members 20,22 may be removed from the tool 10 and stored for later use.

Figure 5:
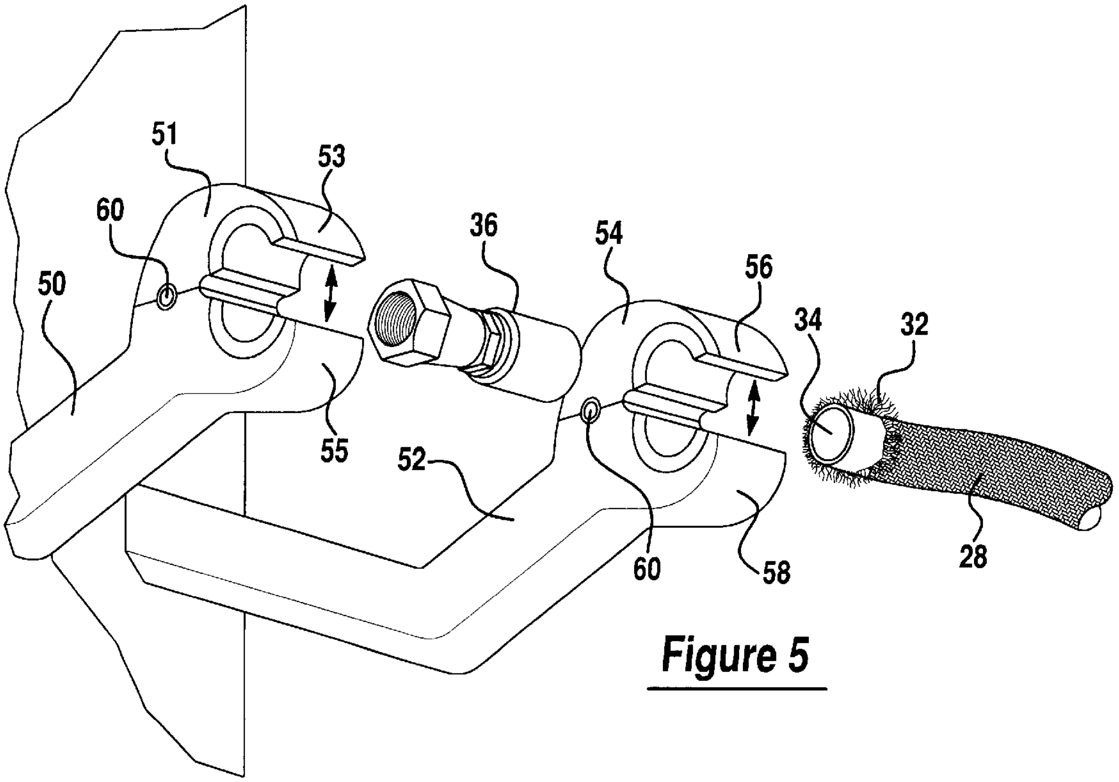
FIG. 5 is a perspective view of a robotic arm assembly which is made in accordance with the teachings of a third embodiment of the invention.

In yet another alternative but non-limiting embodiment, as shown best in FIG. 5, a pair of robotic arms 50,52 may be used to automatically perform the hose connection process. That is, a first of the robotic arms 50 includes a generally “C” shaped end portion 51 having substantially identical portions 53, 55 which are pivotally coupled by pin or fastener 60. Particularly, portions 53, 55 are movable between a first retracted or remote position (shown in FIG. 5) and a contacting position in a conventional manner (e.g. by use of a hydraulic control assembly operable under stored program control (not shown) ). End portion 51 is therefore adapted to selectively and removably grasp the connector 36 by selectively capturing the connector 36 between selectively abutting portions 53, 55. A second of the robotic arms 52 includes a generally “C”-shaped end portion 54 having substantially identical and selectively movable portions 56, 58 which respectively correspond to retention members 20, 22 (e.g. members 20, 22 have become integrally formed with the robotic arm 52) and which are pivotally coupled by a fastener 60. Portions 56, 58 are movable between a first retracted or remote position (shown in FIG. 5) and a contacting position in a conventional manner (e.g. in substantially the same manner as portions 53, 55 are movable).

In operation, portions 56, 58 are retracted as they are deployed on opposite sides of hose 28, effective to cause end 34 to be contained within the portion 54. Portions 56 and 58 then selectively engage, thereby securing the hose end portion 34 within member 54. The robotic arm 50 grasps the connector 36 and forces the connector 36 to attach to the retained hose end 34 which resides within the portion 54. After the connector 36 is attached to the retained hose end 34, the portion 51 is released from contact with the connector 36. In this manner, the connector 36 is attached to the frayed hose end 34 while concomitantly obviating the need for human contact with the frayed portions 32 and greatly increasing the efficiency of the overall hose assembly process.

It should be understood that the invention is not limited to the exact construction or method which has been previously delineated, but that various changes may be made without departing from the spirit and the scope of the invention as set forth in the following claims.

What is claimed is:

1. A method for placing a connector upon a braided hose, said method comprising the steps of:

providing a first member;

providing a second member;

providing first and second retention members;

placing said first retention member upon said first member;

placing said second retention member upon said second member;

placing a portion of braided hose upon said second retention member;

causing said second retention member to contact said first retention member, effective to form a hose reception cavity which contains said portion of said braided hose; and placing said connector upon said portion of said braided hose residing within said hose reception cavity.

2. The method of claim 1 wherein said first and second retention members are substantially identical.

3. The method of claim 2 wherein each of said first and second retention members are semi-cylindrical.

4. The method of claim 1 further comprising the steps of forming a first groove within said first member;

forming a second groove within said second member;

placing said first retention member within said first groove; and placing said second retention member within said second groove.

5. The method of claim 1 further comprising the step of pivotally coupling said first member to said second member.

6. The method of claim 5 wherein said first and second member of each comprise handles.

7. The method of claim 6 further comprising the step of providing a third member; and connecting said third member to said first and second members.

8. The method of claim 7 further comprising the step of allowing said third member to be selectively movable between a first expanded position and a second substantially collapsed position.

9. The method of claim 1 further comprising the steps of integrally forming said first and second retention members with a robotic arm.

10. The method of claim 9 further comprising the step of providing a second robotic arm; and causing said second robotic arm to selectively place said connector within said hose reception cavity.

11. The method of claim 10 wherein said first and second retention members each have smooth hose contacting surfaces.

* * * * *